United States Patent [19]
Kilbel

[11] Patent Number: 5,214,556
[45] Date of Patent: May 25, 1993

[54] VIDEO CASSETTE RECORDER PROTECTION SYSTEM

[76] Inventor: Joseph J. Kilbel, 413 Graham Rd., Cuyahoga Falls, Ohio 44224

[21] Appl. No.: 830,987

[22] Filed: Feb. 4, 1992

Related U.S. Application Data

[63] Continuation of Ser. No. 337,936, Apr. 14, 1989, abandoned.

[51] Int. Cl.⁵ .............................................. G11B 5.02
[52] U.S. Cl. ...................................... 360/137; 360/27
[58] Field of Search ................... 360/60, 33.1, 69, 71, 360/137; 380/5

[56] References Cited

U.S. PATENT DOCUMENTS 4,930,158  5/1990  Vogel ...................................... 380/5

FOREIGN PATENT DOCUMENTS 3314783  4/1984  Fed. Rep. of Germany .

Primary Examiner—Andrew L. Sniezek
Assistant Examiner—Won Tae C. Kim
Attorney, Agent, or Firm—Oldham, Oldham & Wilson, Co.

[57] ABSTRACT

A video protection system that allows selective control of video viewing, providing for the selection of video cassette programs according to ratings or other information provided on the video cassette. The protection system includes means by which viewing may be discriminated against according to ratings or other information applied to the exterior of the video cassette tape as by a label. An sensor, such as an optical sensor placed within a VCR to read the label having rating or other pertinent information is provided. A key lock mechanism or the like is utilized for selecting the viewing level. Associated circuitry is provided which may form part of a VCR or be provided as a separate unit to enable use with existing VCRs. The processing circuitry enables discrimination against viewing if the rating on video tape or the like does not match or fall below a preselected level set in the circuitry by the user.

10 Claims, 6 Drawing Sheets

VIDEO CASSETTE RECORDER PROTECTION SYSTEM

This is a continuation of copending application Ser. No. 07/337,936 filed on Apr. 14, 1989 now abandoned.

BACKGROUND OF THE INVENTION

The present invention generally relates to a control system for use with home video equipment to allow viewing of video tapes to be selectively controlled. More particularly, the present invention relates to a control system in which the user selects video cassette programs which may be played on the video equipment according to a rating given to a prerecorded feature length film or the like which is found on the video cassette.

Rentals of prerecorded video cassette programs for use with home video equipment has become a major industry which is still growing. The home video market has led to the making of hundreds to thousands of new movies and other programs for the box office and home video market or exclusively for the home video market. These prerecorded films may be distributed across the entire country for rental to individuals by a rental agent through means of a video distributing business. The films produced each year comprise titles ranging from children's video to adult films and everything in between including extremely graphic horror films or extremely violent films. A problem has arisen in that many films which were previously inaccessible to children or teenagers are now readily available in the video rental stores. It has thus been found that the parents of these children and teenagers do not have any real control over the movies which can be rented and viewed at home by the children. Many programs which are accessible at video rental outlets to children are given a restricted rating which would be limited to teenagers over 17 years of age or to children only with parental guidance at a theater. The film rating system conventionally used in the industry has been developed so that parents and owners of movie theaters can effectively control the viewing of certain movies to certain classes of people based upon the content of the movie. The obscene language, nudity and violence more frequently found in films presently made are thus indicated with the proper rating such that parents who may object to their children viewing such material may prevent such viewing. With the advent of movie rentals on video cassettes, the parental control over this process has been reduced to a significant degree.

Another problem is found in that many movies which are now produced exclusively for the home video market are not rated at all as the mere number of movies prohibits such a rating scheme. Thus, the parents as well as video rental businesses have no indication of the content of many films. Rental of such films to children may be objectional to the parents but there is no effective way in which viewing of objectionable films may be deterred. Similarly, the parents themselves may have video tapes at their home which they desire not to be viewed by their children, and no effective means has been developed for preventing such viewing.

Several parental control inventions have been developed to prevent unauthorized playing of a video cassette tape, such as that found in U.S. Pat. No. 4,628,713. In this invention, a lock for a VHC video cassette comprises an insert which is placed in a sensor LED transmission receptacle of the housing of the cassette tape. The insert cannot be removed except with a special key and presents a physical obstruction to the cassette tape being inserted into a video cassette recorder. Although the lock apparatus for VHS video cassettes allows some selective control over unauthorized playing of a video cassette by parents or the like, such a system is somewhat ineffective for use by a video rental business and similarly is not useful for other video format video cassettes such as BETA. The use of such a lock is also somewhat inconvenient and requires a plurality of locks to be obtained for each video cassette on which it is to be used.

Similarly, as found in U.S. Pat. No. 4,655,057 a security device comprising a front panel to cover the opening through which a video cassette is placed into a video recorder. Although such a security device prevents unauthorized access to the video cassette recorder for viewing of video tapes, it prevents all use of the video recorder and does not enable selective discrimination against video cassette tapes which are not to be viewed as desired by parents. Another security device is shown in the U.S. Pat. No. 4,656,551, which forms a dummy video cassette which includes an externally operable mechanism to initiate a locking means which locks the dummy cassette into the video recorder as an inseparable unit. In this way, no other cassettes may be placed into the video recorder and use of the video recorder is thereby inhibited.

From these devices, it is seen that prior methods to prevent unauthorized viewing include inhibiting the use of the entire video cassette recorder or alternatively of mechanical apparatus to prevent use of individual cassette tapes. There is not found a convenient and effective way in which viewing of adult movies, extremely violent movies or other objectionable material may be prevented at the discretion of parents or video rental business owners. This discretion may be according to a rating given to the film or other video material by a professional association or alternatively by the parents or video store owners according to the content of the material.

SUMMARY OF THE INVENTION

It is therefore an object of this invention to provide means by which viewing of video cassette tapes may be discriminated against according to information such as a rating or other information applied on the exterior of the video cassette tape by means of a label or the like.

It is another object of the invention to provide selective control by the parents or the like over which movies or other video material may be viewed on a video cassette recorder.

It is a further object of the invention to provide a parental control system for a video cassette recorder which allows prerecorded feature length films to be selectively viewed according to a rating given to the film by a professional rating association or alternatively by a rating given to the film by parents or the like based upon the content of the film.

It is yet another object of the invention to provide means to be placed on the exterior of a video cassette tape signifying a rating given to the content of the video tape to be used in initiating operation of a video cassette recorder for viewing thereof.

These and other objects of the invention are accomplished by means of optical sensing means placed at a position within a video cassette recorder so as to read a label or the like containing information by which initiation of the video cassette recorder is accomplished. There is provided associated circuitry with the optical sensing means which may form part of a video cassette recorder or alternatively may be provided as a separable unit so as to enable use with existing cassette recorders for retrofitting thereof with the control system. The video cassette recorder protection system further includes switch means operable by a key lock mechanism or the like for selecting the level of rating which may be viewed on the video cassette recorder along with display means associated therewith for displaying the level at which the protection system is set or at which rating operability of the video cassette recorder will be initiated. Additionally, there may be provided timing means such that if upper or restricted rating levels of the protection system are set by means of the switch means indicating more adult oriented video material, such a setting will be enabled only for a predetermined amount of time after which the protection system will revert to a more family oriented mode.

BRIEF DESCRIPTION OF THE DRAWINGS

The foregoing and other objects, aspects and advantages of the invention will be understood from the following detailed description of a preferred embodiment of the invention with reference to the drawings, in which.

DETAILED DESCRIPTION OF THE INVENTION

Figure 1:
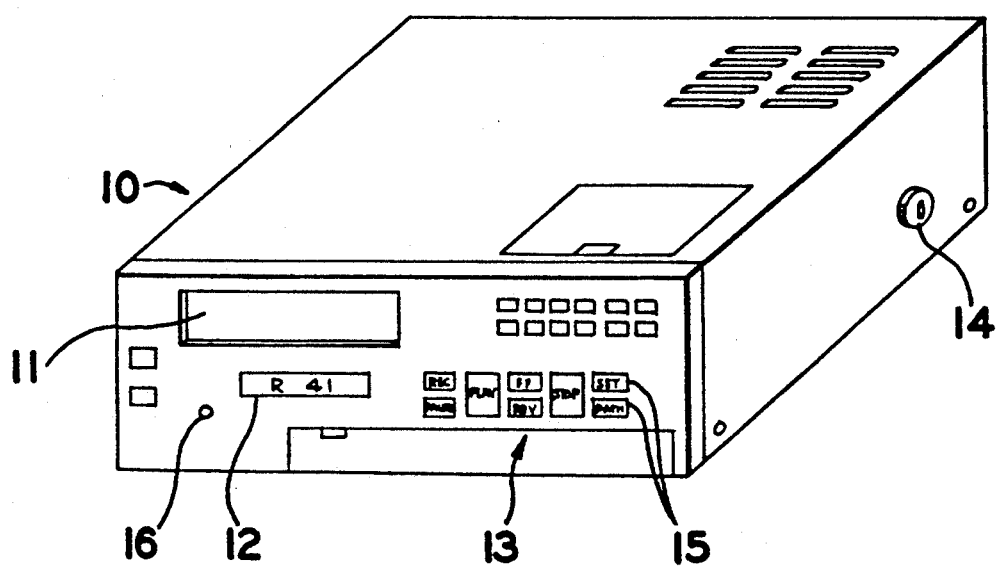
FIG. 1 is a perspective view of a video cassette recorder having the protection system of the present invention associated therewith.

Referring now to the drawings, and more particularly to FIG. 1, there is shown a video cassette recorder having a tape loading and access door 11, a display 12 as well as user function keys 13. The video cassette recorder 10 is conventional in nature but includes the protection system of the present invention having the outward features of a key lock switch 14, user function switches 15 for the protection system as well as an indicator means 16 showing when the playing of a video cassette tape placed in the video cassette recorder 10 is enabled. The display 12 is also utilized with the protection system to indicate the level at which the system is set as well as the level of the video cassette tape inserted into the video cassette recorder 10, or other information as desired.

Figure 2:
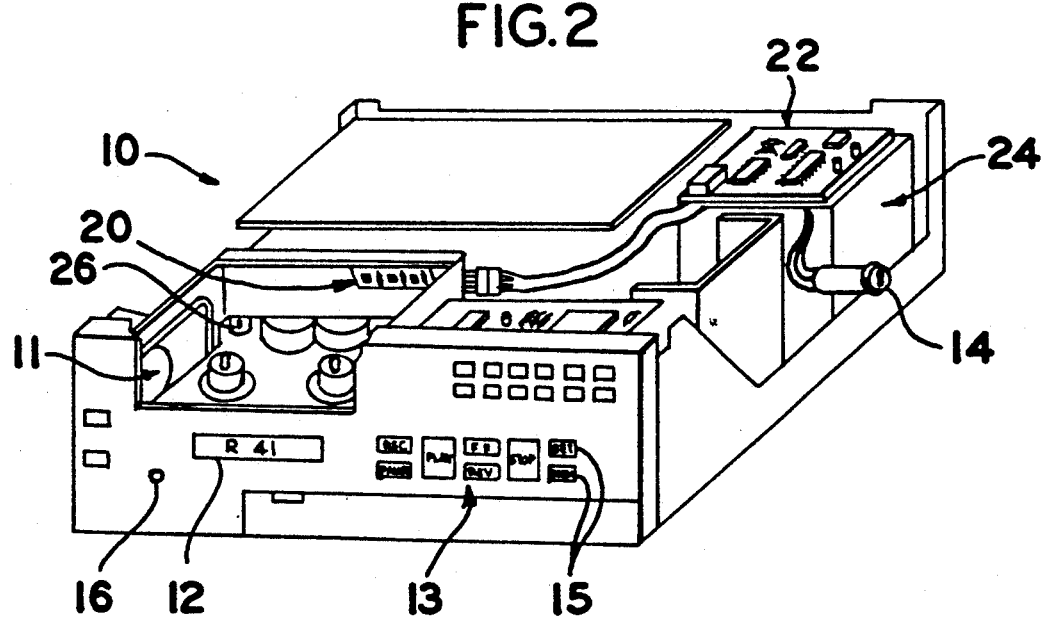
FIG. 2 is a perspective view of the video cassette recorder as in FIG. 1 with its top cover portion removed therefrom showing some components of the protection system.

Turning now to FIG. 2, the video cassette recorder 10 is shown with its cover removed to view the internal circuitry and components of the protection system. As previously described, the protection system of the invention is designed to detect the presence of a rating given to the material on the video cassette tape such as feature length films and other video material. In one embodiment, the rating information may be placed on a label positioned on the exterior of the video cassette tape. When the tape is inserted into the video cassette recorder 10 the label will be detected by a sensor board 20 which is coupled to processing circuitry found on circuit board 22 which will be described in more detail as the description proceeds. Also coupled to the circuit board 22 is the key lock switch 14 which may be utilized to select the rating of the video material which can be viewed on the video cassette recorder 10.

As an example, parents having small children or young teenagers may wish to limit the viewing by these children to movies and other video material having a rating of PG-13 as designated by the Motion Picture Association (MPA). The protection system is set such that only tapes of a PG-13 or less innocuous ratings may be played on the video cassette recorder 10. The rating level is set by key lock switch 14 which may be a three position switch having off/on and incrementing positions. When the key lock switch is in its off position, the protection system is disabled and inoperative and any video cassette tape may be played in the VCR 10. When the key lock switch 14 is in its on position, the protection system is operative and only those video cassettes tapes which have a rating equal to or lower than a set rating would be enabled to play in the VCR 10. In its third position, the key lock switch 14 will increment the rating at which the protection system is set to select the desired level or rating at which the VCR 10 will be operative to play a video cassette tape. In order to view a type which has a rating higher than the set rating, the key lock switch 14 must be incremented until that rating level is reached thereby enabling operation. The indicator means 16 will light when the VCR 10 is enabled to play a video cassette tape loaded therein. Thus, the parents are provided with effective control over the video material which may be viewed by use of the VCR 10, and accidental viewings of inappropriate video material can be prevented.

In one embodiment of the protection system, the circuit 22 is designed to be coupled with the RF output generally located at 24 of the VCR 10 so as to interrupt the RF output when the protection system is set to rendering the VCR 10 inoperative. Thus, if video material having a rating higher than that at which the protection system is set is placed into the VCR 10, the RF output will be interrupted to prevent viewing of this material. The circuit 22 may be positioned at the location of a jumper in the RF output so as to complete the RF output circuit with the protection circuit 22 interposed therein. Similarly, the audio and video outputs normally included on VCR's may also be interrupted to prevent viewing of the video material on a monitor television or the like. Although it has been found that interruption of the RF output and audio/video outputs yields an effective means by which viewing of unauthorized video material is prevented, the invention also contemplates other similar methods such as coupling the protection circuitry into other common circuitry associated with the VCR 10. For example, the protection circuitry 22 may be coupled to the pause circuitry of the VCR 10 such that the pause capability of the VCR 10 will be initiated upon any attempt to view unauthorized video material. In a similar manner, the protection circuitry 22 may be coupled to the play button circuitry of the VCR 10 to interrupt the play circuitry and thereby prevent playing of unauthorized video material.

The information processed by the protection circuitry 22 is supplied via the sensor board 20 which may comprise a plurality of sensors positioned relative to the location of a video cassette tape being inserted into the VCR 10 or relative to the position of the tape when being played. As previously described, the rating information given to the video material on a video cassette tape may be provided on label placed on the exterior of the tape housing including a means by which a plurality of sensors on the sensor board 20 can detect the rating information and supply it to the protection circuitry 22 for processing. The number of sensors needed to effectuate the desired discrimination based upon rating of video material will depend largely upon the number of different ratings to be used. It has been found that conventional rating systems by professional rating organizations can be adequately accommodated by use of three sensors yielding eight different settings or rating levels in the protection system. It is of course recognized that additional sensors may be utilized to expand this number or alternatively the number reduced as desired.

There may also be provided a switch 26 such as a micro switch which may be conventionally supplied with the VCR 10 to indicate the presence of a video cassette tape in the VCR 10. This switch may be utilized to complete the circuit in the event that no tape is positioned in the VCR 10 so that the RF output is not interrupted and normal viewing of the TV may be provided. Alternatively, an additional sensor may be utilized on the sensor board 20 to effectuate the same result of completeing the circuit and providing the RF output when no tape is in the VCR 10. The protection circuitry 22 may also include user functions which is 15 which may for example allow the user to set a predetermined rating as a default to which the protection system will revert under certain circumstances. There may also be provided a user function switch to allow different rating systems to be displayed on display 12 of the VCR 10 in case several rating systems are being utilized in the industry. Other user interface functions may be provided as desired to accommodate other features into the protection system such as the capability of setting a predetermined time limit in which the VCR 10 will be operative to play tapes of certain ratings or other capabilities recognized by those skilled in the art.

Figure 3:
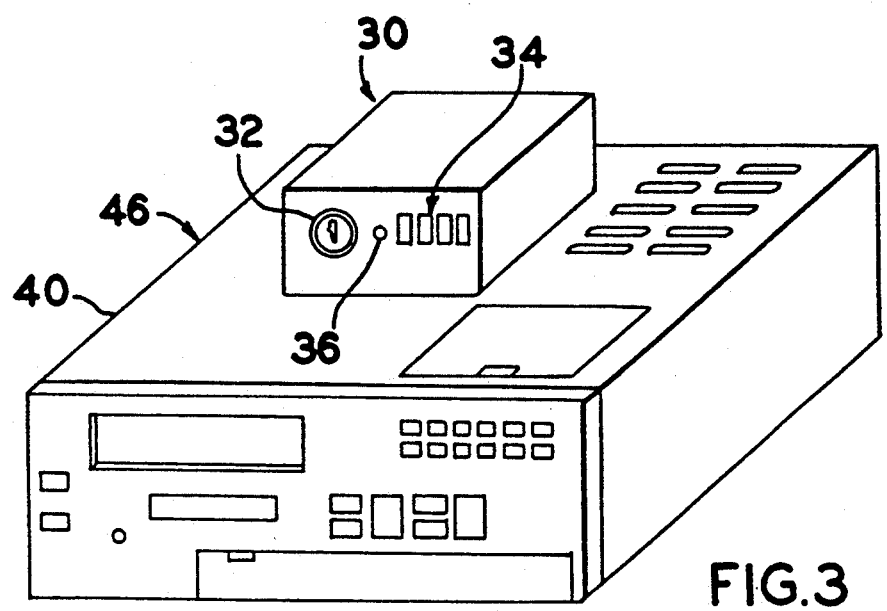
FIG. 3 is an alternate embodiment of the protection system of the invention showing an after market unit adapted to be associated with existing video cassette recorders.
Figure 4:
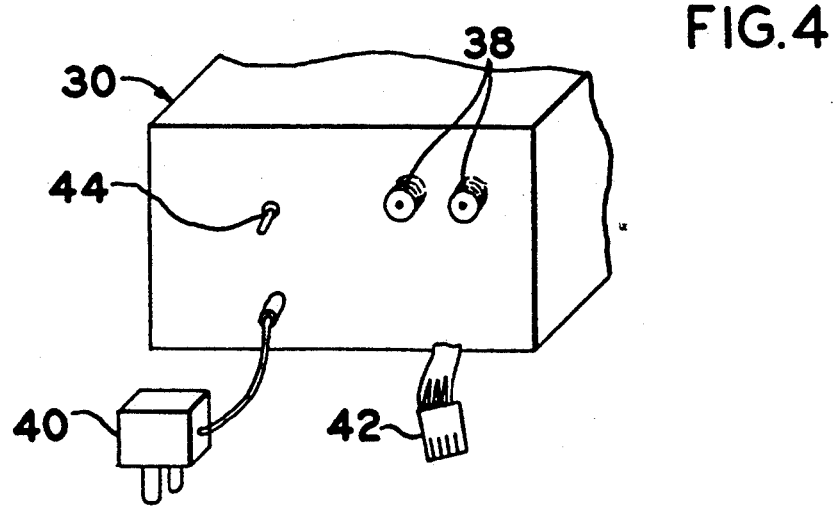
FIG. 4 is a perspective view of the protection system or after market unit as shown in FIG. 3 showing the rear side thereof.

An alternate embodiment of the present invention is shown in FIGS. 3 and 4 which comprises an after market unit 30 which may be coupled to a VCR 40 manufactured without the protection system incorporated therein. The after market protection system 30 may then be retrofit with VCR 40 to incorporate the protection system into existing VCR systems. The after market unit 30 comprises the same basic components as in the embodiment of FIGS. 1 and 2 and includes a key lock switch 32 which functions in a manner similar to that previously described. The after market unit 30 also comprises its own display 34 as well as the indicating means 36 for indicating when VCR will be operational. The protection system circuitry is mounted inside the housing of the after market unit 30 it will function in a manner similar to that previously described. As shown in FIG. 4, the after market unit 30 also includes video input and output terminals 38 to couple the after market unit 30 to the conventional VCR deck. Also included is a power supply 40 to provide a power necessary for the protection system circuitry. It should be recognized that the only components of the protection system which must be incorporated into the VCR 46 is the sensor board described relative to FIGS. 1 and 2. The sensor board mounted in the appropriate location to scan the video tape inserted into the VCR 46 is then coupled to the protection system circuitry via coupler 42. The after market unit 30 may also be provided with user functions which may comprise a switch 44 to alter the display between different rating systems, or to preset the level to which the protection system will revert upon actuation, or other user functions as desired.

Figure 5:
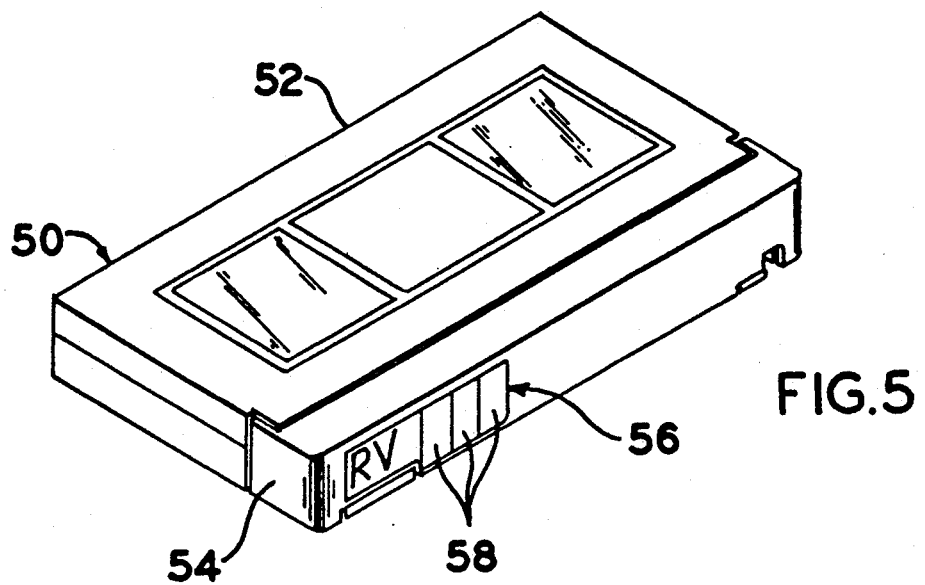
FIG. 5 is a perspective view of a video cassette tape showing a position for a label to be read by the protection system of the invention, making the cassette tape playable or unplayable according to its rating which is encoded on the labels.

Turning now to FIG. 5, a conventional video cassette tape 50 is shown having an outer housing 52 as well as a pivotal tape protection cover 54 which is raisable to a position for playing of the video cassette. A label 56 having rating information encoded thereon at 58 may be positioned at any location on the video cassette 50 so as to be read by sensors located in the video cassette recorder. It has been found that any format of video cassette (VHS or Beta) is normally positioned in a similar manner within various video cassette recorders such that the location of the label 56 as shown in FIG. 5 has proved to be a convenient and effective location for the label 56. This location is also very convenient for the after market unit and locating sensor board thereof. The labels is also conveniently located relative to a cut-out portion 57 which is conventionally found on the cover 54 so as to ensure proper placement.

It should be noted that the label 56 maybe used on any format of video cassette tapes such that a uniform system may be adopted for use by video rental outlets as well as video cassette manufacturers of prerecorded films or the like. It should be also be recognized that the location of the label 56 may be varied as desired, but a uniform system would be most desirable to The labels 56 show a preferred embodiment of supplying a video cassette 50 with rating information thereon to be utilized by the protection system of the invention. The labels 56, which will be described in more detail hereinafter, could also comprise other forms as desired as long as the rating information is available to sensors or circuitry located within the video cassette recorder. For example, the rating information may take the form of a bar coded message on a label to be read by a bar code reader in the video cassette recorder. The bar code reader could read the information as the video cassette 50 travels into its playing position within the recorder.

It is also contemplated that the rating information could be placed on the video tape itself, for example on a separate video, audio or other track on the tape, to be read by the video or audio heads for initiation and actuation of the protection circuitry. In this type of embodiment, it should be recognized that the user would then be able to encode the rating information onto the tape itself during recording thereof so as to separately rate different material on a single video cassette tape or alternatively to modify the rating within a single program so as to edit out portions thereof which may be objectionable. In this embodiment, a combination of on/off signals may be provided by the encoded signals to the protection circuitry to indicate the rating given to the video material contained on the video tape.

It is also contemplated that the protection system of the invention could be utilized with signals provided in the actual transmitted television and cable signals. The signals could be provided in what is known as the vertical interval of the transmitted signals to yield a proper combination of on/off signals to provide the rating information for the video material transmitted. Thus, the broadcasters or cable operators could also provide rating information along with the transmitted broadcast signals over a transmission cable which is input into a VCR deck having the protection system incorporated therein. A decoder in the VCR would then be used in place of the sensor board of the embodiment described herein to give effective control of the TV or cable programs transmitted to the user's home. In this way, individual programs or portions thereof could be discriminated against by the protection circuitry of the invention as desired by parents or the like. It should be understood that in order for this embodiment to be effective, the rating signals would necessarily need to be standardized such that the decoder placed in the VCR deck could be utilized with different programming material.

Figure 6:
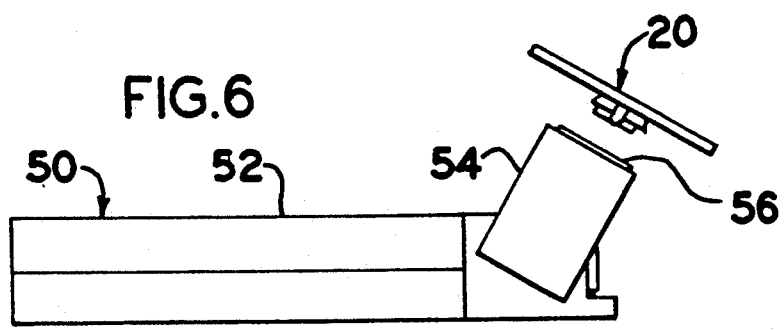
FIG. 6 is a side elevational view of the video cassette tape shown in its playing position as would be found in a video cassette recorder and its relative position to the sensors of the protection system.

Turning now to FIG. 6, the video cassette tape 50 is shown in what would be the playing position within a VCR with the tape cover member 54 raised so as to make the video tape accessible to the video heads within the VCR. The location of the label 56 is designed to be placed in scanning relationship to the sensor board 20 positioned as shown in FIG. 2. This location has been picked due to the ease of installation of the sensor board into an existing VCR unit for the retrofit or after market embodiment of the invention. In this position, the label 56 will be accurately scanned regardless of which way the tape is loaded or the particular format of the tape being utilized.

Figure 7:
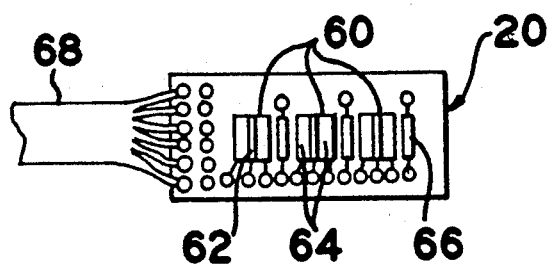
FIG. 7 is a plan view of the sensor board of the protection system.

The sensor board 20 as described for use with the preferred embodiment is shown in FIG. 7 and comprises a combination of three sensors 60 which may comprise an optical emitter/sensor such as a Siemens SFH900 type light reflection emitter/sensor. This type of a emitter/sensor is a reflex optical sensor which operates over short distances in the infra red range and includes a GaAs infra red LED transmitter 62 along with an NPN phototransmitter 64 with a high photosensitivity receiver. In this type of emitter/sensor there may be provided a daylight filter which screens against undesired light effects to provide the desired operating characteristics.

The emitter/sensor 60 is of small dimensions so as to be accommodated at a location within the VCR deck such as described with reference to FIG. 2. With this type of optical sensor, differences between white and black surfaces may be resolved so as to provide a means by which a label can be constructed to provide rating information. The rating information in a preferred embodiment is described by means of a combination of alternate white and black zones which will be sensed by the emitter/sensor 60 to provide an on/off signal to the protection circuitry. As long as the emitter/sensors 60 are in relatively close relationship to the label having the rating information thereon, the emitted light signal will be reflected to the sensor of the configuration to yield collector currents at the sensor differing by a factor of about 25 between white and black surfaces. The rating information may be provided in alternate white and black surfaces, wherein white surfaces will strongly reflect and black surfaces will attenuate the signals.

Although the optical sensor as described provides a reliable and accurate determination of rating information provided on a label positioned on a video cassette, other sensor combinations may be utilized. For example, a Hall-effect magnetic sensor may be incorporated into the VCR deck in an appropriate location to sense the incorporation of a small dot of metallic ink placed on a label to be positioned on the video cassette. Alternatively, the means by which the Hall-effect magnetic sensors are activated could be incorporated into the video cassette itself. As mentioned previously, there may also be provided a bar code label to be read by a bar code reader positioned inside the VCR deck. It should be recognized that other forms of emitting and sensing equipment could be utilized and are embodied within the present invention.

The sensor board 20 including optical sensors 60, described with reference to FIG. 7, also include suitable resistors 66 to generate a voltage proportional to the white or black surface sensed by the optical sensors 60. There may also be provided in the protection circuitry a series of potentiometers to equalize the signals received by the respective sensor 60 to provide accurate and reliable determination of the rating information provided on a label. The sensor 60 are coupled to the protection circuitry by means of coupling wire 68 to provide on/off signals from each of the sensors 60 in accordance with the rating information provided on or with the video cassette tape.

Figure 8:
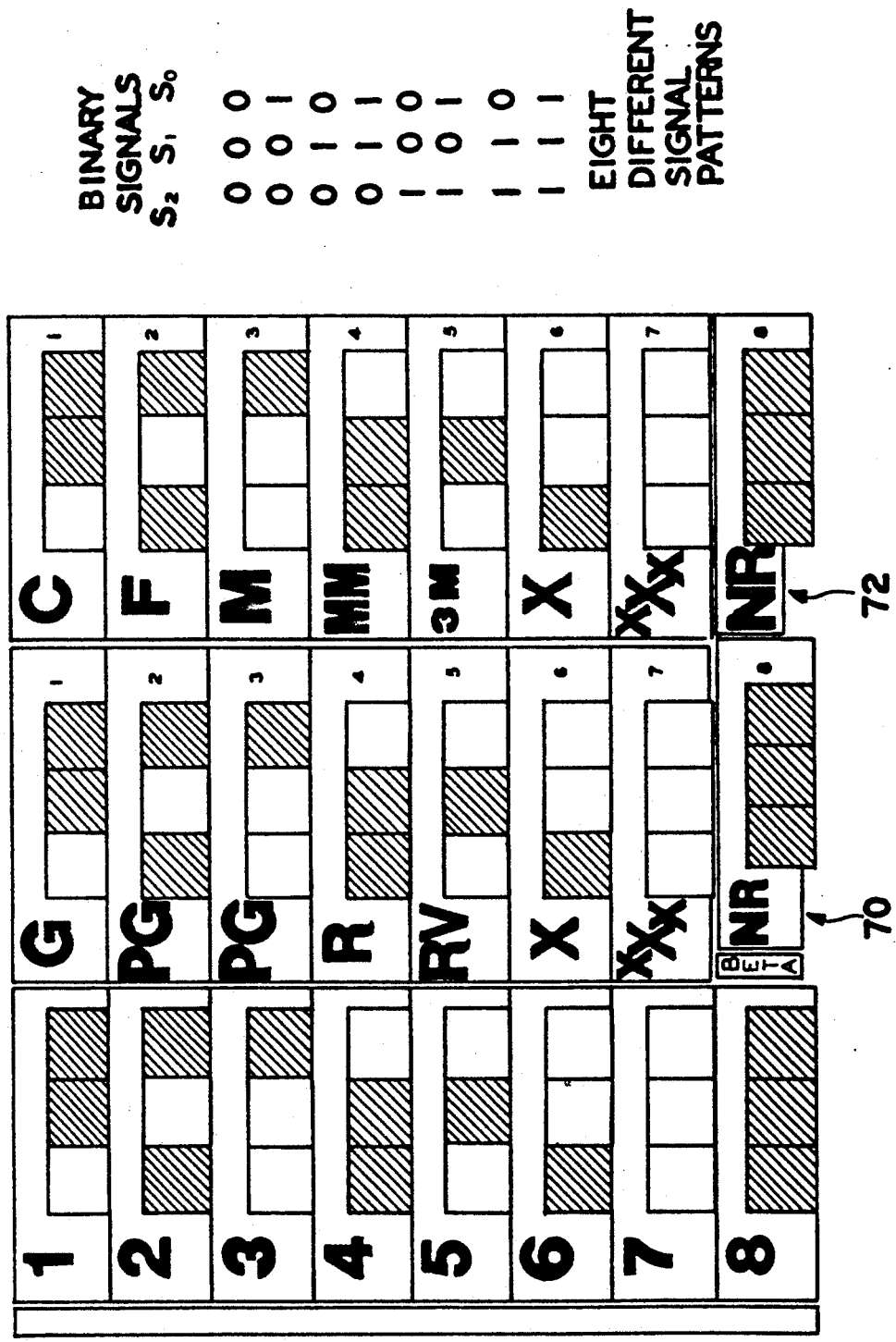
FIG. 8 is a coding scheme for the labels used with the protection system.

Turning now to FIG. 8, the coding scheme for rating to be incorporated on the labels of the invention are shown for the preferred embodiment thereof. As mentioned previously, the present rating systems as provided by professional rating organizations may be fully described by means of eight different ratings. This number of ratings can be obviously varied by the addition or subtraction of a sensor or the like to accommodate different rating systems.

In the preferred embodiment, the rating levels are accommodated by a series of white and black surfaces having a width to account for any disconformities in label position. These surfaces provided binary code signals by means of the sensors which are input to the computer of the processing circuitry as a means of indicating the rating of the video material. A rating described as non-rated video material accounts for movies which have not been rated by a professional rating organization which may or may not be objectionable but will nonetheless be prevented from viewing as desired. This rating will normally be invoked if no label is placed on the video cassette tape. As shown in FIG. 8, the motion picture association rating schedule including additional ratings for restricted material including extreme violence or nudity may be provided. Another professional rating organization such as the Film Advisory Board rating system may also be accommodated by the embodiment of the invention described.

Although the labels as shown in FIG. 8 include various black and white surfaces to provide the rating information thereon, it is desired to preclude the ability to modify the labels to overcome the protection system. The label, although having white and black surfaces, may also be provided with an invisible or non-pigmented black ink over the entire label surface so as to present a fully black surface to the human eye whereas the optical sensors will distinguish between the original white and black surfaces as desired. The black surfaces may be provided by a heavy pigment black ink whereas the white surfaces will include a non-pigmented ink to give the appearance of a black surface and yet show as white to the optical sensors. The label associated with the invention may also be laminated with a polyethylene or urethane type material to produce a long lasting and durable label which may also be over printed with the rating information or other desired material. The base of the label stock may be a paper material or a tin foil film such that various colors of printing giving the rating information or the like may be provided. It should be recognized that the particular coding scheme as shown in FIG. 8 may be varied as desired to yield different rating coding schemes or to include different features for different sensing equipment. Also as seen in FIG. 8, the label may be used with any type format wherein a die cut shape as seen at 70 and 72 will provide proper placement for formats such as Beta and VHS at 70 and 72 respectively.

Figure 9:
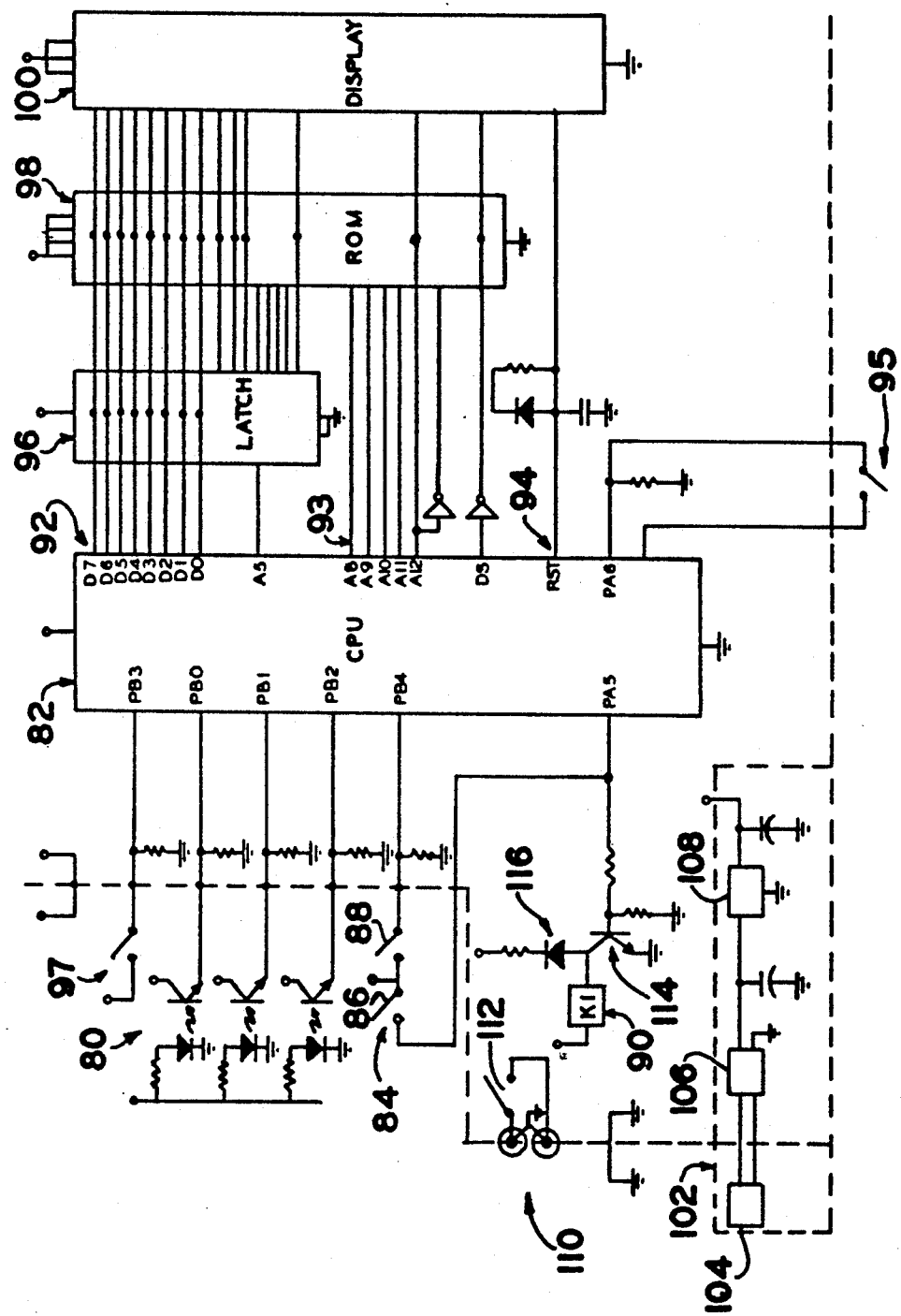
FIG. 9 is a schematic diagram of the electrical circuit used in the protection system.

The protection circuitry of the invention in relation to a preferred embodiment thereof is shown in FIG. 9. The protection circuitry comprises a basic computing means utilized to receive the signals produced by the sensing means and to interface with a display means. As shown in FIG. 9, the protection circuitry comprises several main components consisting of a series of sensors 80 which in the preferred embodiment are optical emitters and detectors. The sensors 80 act as detecting switches which will detect the presence of white or black areas on the label situated on a video cassette tape and produce on/off signals. The signals generated by the sensors 80 are fed to a CPU integrated circuit 82 which may be of any conventional design to provide processing of the signals received from the sensors 80. The key switch or any other suitable switch 84 is provided to communicate with the CPU 82 to turn the protection system on or off by means of a first switch 86, and to select the desired setting for the protection system by means of a second bump switch 88. The first switch 86 acts to turn a relay 90 on so as to enable the VCR in which the protection system is provided to function normally or effectively remove any affects of the protection circuitry. When the switch 86 is set so as to turn the relay 90 off then the protection system of the invention will be invoked. The switch 88 will then be utilized to set the level at which the protection circuit will enable operation of the VCR by turning the relay 90 on to complete the RF output of the VCR. In the preferred embodiment the switch 88 is a bump switch having eight settings to provide the eight different ratings as previously described. It is understood that the key switch 84 could be integrated into a VCR. For example, an enabling switch to be initiated by a code or the like will allow the user to set the rating at which the VCR would be operative or to take the protection system out of use as desired while preventing unauthorized or accidental viewing.

The CPU 82 includes a plurality of data outputs shown generally at 92 to subsequently provide information from the CPU to a display means 100 which will indicate the level at which the protection system is set or alternative information is desired. The CPU 82 also comprises a plurality of address lines generally indicated at 93 which allow software control of the CPU 82 by means of a read only memory (ROM) integrated circuit 98. The ROM memory 98 is provided with software control for the operation of the protection system to provide desired characteristics such as a timer which will be initiated upon activation of the protection system at an upper rating level. The address lines 93 are utilized to turn on the ROM 98 and will read instructions therefrom so as to output the proper information to the display 100 as well as to effect proper control of the protection system.

The CPU 82 is also coupled to a latch 96 which operates to couple the computer to the display 100 via data lines 92 when needed. When the CPU 82 is computing the latch 96 will effectively isolate the display from the CPU to enable proper functioning and operation of the protection system. The protection system is powered by a power supply 102 having a nine volt source 104 which may be a plug in transformer adapted to be coupled with a power source provided in the VCR. The power supply 102 also comprises a bridge circuit 106 which will regulate the input power whether it is an AC or DC signal or if the input voltage varies. The power source 102 generates a required five volt supply at 108 to turn the relay 90 off and on to effect operation of the protection system.

In operation, when the VCR or protection system is powered up, there is a power on reset 94 which will act to place the protection system at a preselected level or known state initially. The state at which the protection system will be set initially may be selectively controlled by means of a switch 95 which may be a four position dip switch to select any of the lower ratings of the protection system. Other functions may be accomplished by additional switches such as that provided at 97 coupled to additional ports on the affect modification of the displayed ratings generated by the CPU. After initial power has been supplied to the protection circuit, the CPU 82 will determine the setting of the sensors 80 and, based upon the setting of the protection system accomplished by the bump switch 88, will enable operation of the VCR by turning the relay 90 on to complete the RF output of the VCR at 110 by completing the circuit at 112. The relay 90 is turned on and off by a transistor 114 initiated by means of the CPU 82 or by operation of the on/off switch 86. The authorization LED or similar signaling means is operated in conjunction with the relay at 116 to indicate when the VCR is enabled for operation.

Figure 10:
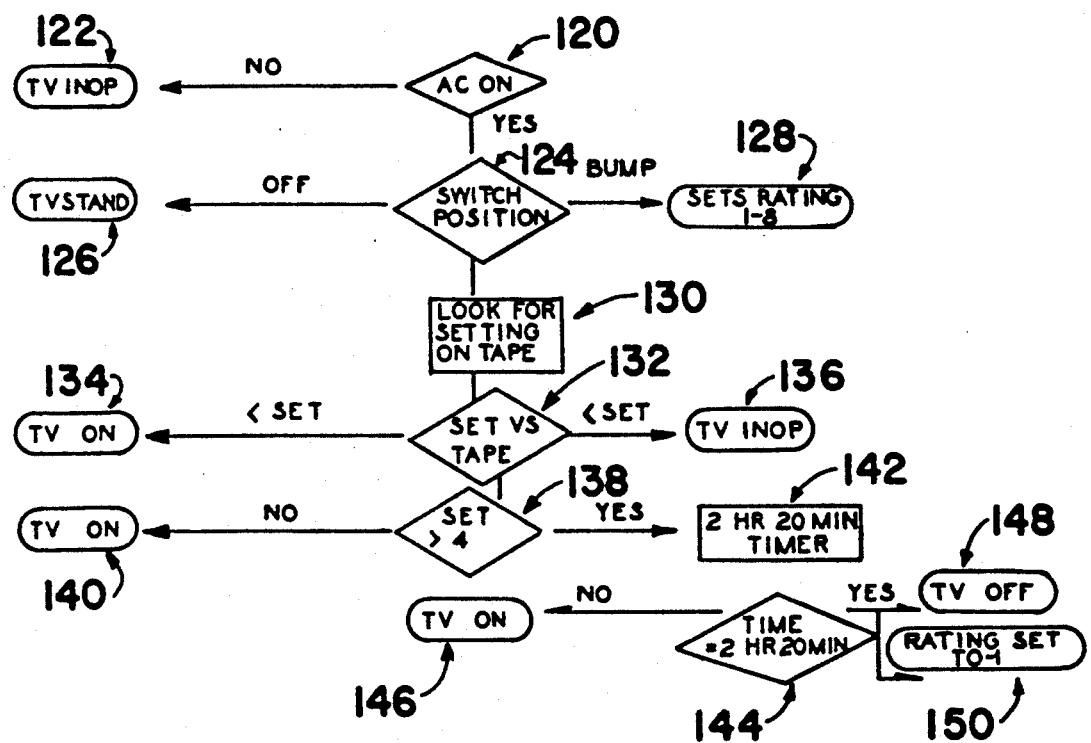
FIG. 10 is a flow diagram of the operation of the protection system for selective use of the video cassette recorder as desired.

The operation and software control of the protection system will be distinctly seen with reference to FIG. 10 showing the basic operation of the protection system. As seen in FIG. 10, power must be provided at step 120 or the TV will be inoperative as shown at 122. If power is provided, the CPU will next determine the key switch position at 124 which, if in the off position, will disable the protection systems such that the TV will operate in a normal fashion at 126. If the key switch is in the on position, the bump switch will then set the rating at which the VCR will be enabled to play a video cassette tape at 128. The CPU of the protection circuitry will then determine the rating of the video material via the combination of sensors in conjunction with the label provided on the video cassette tape 130. The CPU will determine the set rating as compared to the rating given to the video material on the video cassette tape at step 132. If the rating as determined by the label is less than or equal to the set rating of the protection system, playing of the video cassette will be enabled for viewing on the TV at step 134. On the other hand, if the rating as determined by the label is greater than the set rating of the protection system, the RF output of the VCR will be interrupted and the TV will remain inoperative to prevent viewing of this material at step 136.

In the preferred embodiment, software control may also be provided such that the CPU will determine whether the setting of the protection system is less than or equal to a predetermined rating level such as a restricted rating at step 138. If the setting of the protection system is less than or equal to the this level and the video cassette tape is authorized, the TV and viewing will remain authorized at step 140. If the setting of the protection system is greater than this rating at step 138, a timer function may be invoked at step 142. Thus, if the protection system is set at an adult oriented rating, the timer function at step 142 will be invoked such that viewing at that rating level will be enabled for a predetermined amount of time which may be preset or selected as desired. As long as the viewing time remains less than this predetermined amount of time as determined in step 144, the TV will remain operative for viewing at step 146. Once the predetermined time limit has been reached at step 144, the protection system will disable viewing on the TV at step 148 and the setting of the protection system will revert to a predetermined setting at 150 which may be set by the software or preset by the user using a switch associated with the protection circuit.

It may thus be seen that the protection system provided by the present invention enables effective control over the type of video material which may be viewed utilizing a VCR or alternatively. If signals provided to a person's home. The protection system will prevent viewing of unauthorized video material as determined by a rating given to the material by a professional rating organization or by the user. It can be seen that there may be wide variations in the particular method of providing the rating information with the video material as well as the protection circuitry to sense and process this rating information. While the invention has been described in terms of preferred embodiments thereof, those skilled in the art will recognize that the invention may be practiced with various changes and modifications in the construction and mode of operation which has been described. Such variations and modifications can be made in the foregoing preferred embodiments without departing from the spirit and scope of the invention as set forth in the appended claims.

What is claimed is:

1. A protection system to establish selective playback capability for use with a video display system comprising:

information containing means positioned on a housing associated with video material to be viewed on said video display system, said information containing means including information relating to one of at least three rating levels representative of the rating of said video material, sensing means comprises of at least one optical sensor fixedly associated with said video display system to detect and read said information containing means and generate a control signal corresponding to said one rating level of the said at least three rating levels of said video material from said information containing means, rating selection means allowing a user to independently and selectively pre-select one of said at least three rating levels wherein said pre-selected rating level will determine the rating of said video material which can be viewed on said video display system, said rating selection means generating a reference signal corresponding to said pre-selected rating level;

processing means to receive said control signal from said sensing means and said reference signal from said rating selection means for comparison of said control signal to said reference signal and wherein said processing means is coupled to said video display system and will prevent viewing of video material having a rating level indicated by said information containing means which is above said pre-selected rating level;

wherein said information containing means is positioned on said housing at a predetermined position which is readable by said sensing means, and said sensing means detects the presence of said information containing means such that if no information containing means is present, said processing system will prevent viewing of video material on said video display system, and, wherein said at least one optical sensor transmits a light signal against a portion of said information containing means to be reflected back and detected, wherein the reflected signals will provide on/off signals dependent on said portion of said information containing means from which said reflected signals are received to generate said control signal representative of said rating of said video material.

2. A protection system as in claim 1, wherein said information containing means comprises a label to be positioned on a video tape cassette and having optically readable indicia thereon to be sensed by said sensing means when said video cassette tape is in its operative position within a video cassette recording machine, and wherein said sensing means comprises three optical sensors, each of which will generate a signal, and which together will yield eight combinations corresponding to eight different rating levels.

3. A protection system as in claim 1, further comprising said rating selection means comprises, switch means to select one of said at least three rating levels in said processing means to be compared with said control signal.

4. A protection system as in claim 1, wherein
said processing means comprises a computer means having a control system to compare said control signal and said reference signal to enable initiation of said protection system.

5. A protection system as in claim 1, further comprising a timer means associated with said processing means to enable viewing of said video material which is rated higher than said preselected rating for a limited amount of time when initiated.

6. A protection system as in claim 1, wherein
the protection system is associated with a video cassette recorder and said processing means acts to interrupt the RF output of said video cassette recorder upon initiation of said protection system to prevent viewing of said video material.

7. A protection system as in claim 1, further comprising
display means coupled to said processing means to display the indication of the rating of said video material from said information containing means and, as well as said preselected rating set in said processing means,
user input switches to modify operation of said processing means.

8. A protection system as in claim 1, wherein
said sensing means is incorporated into a video cassette recorder to sense said information containing means positioned on a video cassette tape,
said processing means is provided in a separate housing structure and coupled with said sensing means by electrical cable so as to provide a protection system to be retrofit into existing video cassette recorders.

9. A protection system as in claim 1, wherein
said video display system is a video cassette recorder, said housing is associated with a video cassette tape having video material of a predetermined rating level, and said information containing means is a label placed at a predetermined position on said video cassette tape such that said sensing means will read said information containing means when said video cassette tape is in a playback position in said video cassette recorder.

10. A protection system as in claim 9, wherein
said label comprises a series of optically detectable white and black zones, wherein said zones will provide binary code signals to be utilized by said processing means giving an indication of the rating of said video material.

* * * * *